Aug. 9, 1949.  L. KIESOW  2,478,278
CHRISTMAS TREE STAND
Original Filed June 10, 1940
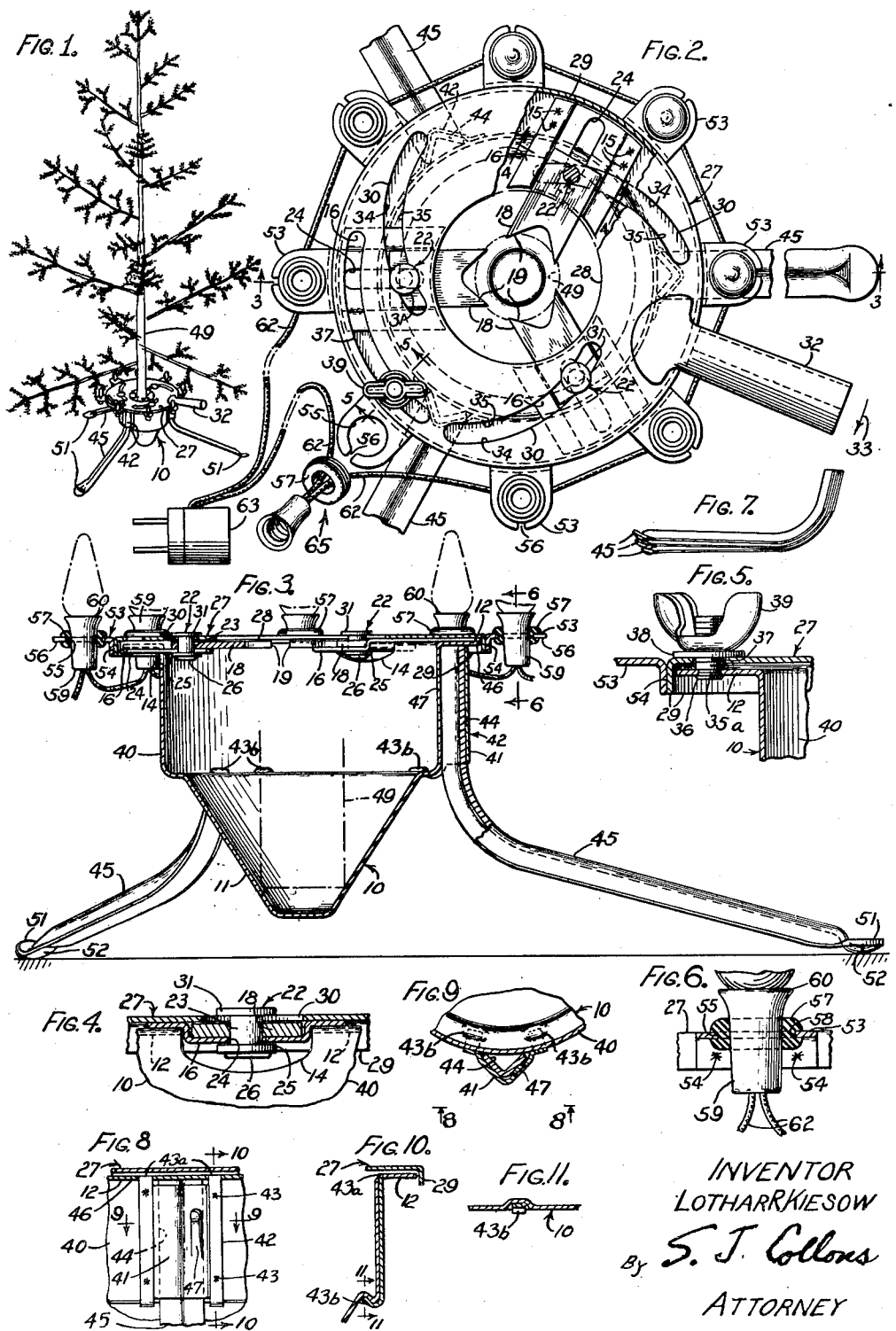
INVENTOR
LOTHAR R. KIESOW
By S. J. Collons
ATTORNEY Patented Aug. 9, 1949

2,478,278

UNITED STATES PATENT OFFICE 2,478,278

CHRISTMAS TREE STAND

Lothar Kiesow, Wheaton, Ill., assignor to Sears, Roebuck and Co., Chicago, Ill., a corporation of New York Substituted for application Serial No. 339,596, June 10, 1940. This application March 8, 1944, Serial No. 525,480

6 Claims. (Cl. 248—48)

This is a substitute for abandoned application, Serial No. 339,596, filed June 10, 1940, for "Christmas tree stand."

This invention relates to supports, and is concerned more particularly with stands or holders for Christmas and other trees, posts and the like.

It is an object of my invention to provide a support of the character referred to adapted to maintain Christmas trees securely in place irrespective of the diameters of the trunks thereof.

It is a further object of the invention to provide a support of the character referred to such that the assembled support and tree will have a lowered center of gravity.

A further object is to provide a tree stand having a receptacle adapted to hold water for the tree trunk.

It is an additional object of the invention to provide a support of the character referred to which may be dismantled and packed in a relatively small space.

Another object resides in the provision of a stand of the class referred to constructed in such a manner as to grip the trunk well above the base thereof irrespective of its diameter.

It is also an object of the invention to provide a support of the type referred to which will hold the tree or the like upright and may be locked in or unlocked from any adjustment by a single operation.

It is another object to provide a chuck-like structure which may be opened or closed by a single movement.

A further object is to provide a stand for Christmas trees and the like, adapted to fasten the tree in place independently of the legs of the stand.

An additional object resides in the provision of lamps in such relation to the supported tree as to greatly enhance the appearance of the ensemble.

Another object involves the provision of an improved mounting for such lamps.

It is a further object to provide a novel method of assembling a lamp with its support.

Further objects and advantages of the invention will appear as the description proceeds.

The invention may be better understood upon reference to the following description and claims and the accompanying drawing, in which:

Fig. 1 is a perspective view of an ensemble of a stand and lamps constructed in accordance with my invention, together with a supported tree;

Fig. 2 is an enlarged fragmentary plan view of the stand and lighting assembly constructed in accordance with my invention;

Fig. 3 is a sectional view taken as indicated by the line 3—3 in Fig. 2;

Fig. 4 is an enlarged fragmentary sectional view taken as indicated by the line 4—4 in Fig. 2;

Fig. 5 is an enlarged fragmentary sectional view taken as indicated by the line 5—5 in Fig. 2;

Fig. 6 is an enlarged sectional view taken as indicated by the line 6—6 in Fig. 3;

Fig. 7 shows the legs nested for shipment or storage;

Fig. 8 is a fragmentary section-elevation showing a leg socket and a leg fitted therein, taken as indicated by the line 8—8 in Fig. 9;

Fig. 9 is a plan sectional view taken as indicated by the line 9—9 in Fig. 8;

Fig. 10 is a sectional view taken as indicated by the line 10—10 in Fig. 8; and

Fig. 11 is a sectional view taken as indicated by the line 11—11 in Fig. 10.

The invention involves the provision of a cup 10 having a frusto-conical base 11 on which the lower ends of posts, Christmas and other tree trunks and the like may rest as may be gathered from Fig. 3. Although I illustrate a tree, it is to be understood both as to the description and as to the claims that a post or similar element is equivalent thereto. The cup 10 is preferably adapted to contain and hold water in the bottom thereof for the bottom of a tree therein, and may be formed with an outwardly projecting flange 12 which, at suitable intervals on the periphery thereof, has preferably radial openings 14. The number of such openings may be varied as desired, and for illustrative purposes only I have included three, preferably equally spaced. In each depression is welded as at 15 or otherwise suitably secured a channel 16.

Slidably fitted in each channel is a jaw 18 having a biting grip portion 19 adapted to project radially to engage the surface of the post or trunk to be supported.

Each jaw 18 is slidably retained in its respective channel 16 by a stud 22 passing preferably loosely through the outer portion of the jaw as at 23 and through a guide slot 24 in the channel, said stud having a bottom collar 25 which is slidably engageable with the lower side of the channel at opposite sides of the slot. This collar may be integral with the stud or securely retained thereon as by upsetting the adjacent end 26 of the stud.

Slidably supported over the flange 12 is an annular plate 27 which overlies the channels 16 and has its inner periphery 28 sufficiently large to admit posts, tree trunks, and the like within the desired range of diameters.

For example, a stand for home use could be constructed in accordance with my invention to accommodate the largest tree that the home itself could accommodate in service.

The plate 27 may have a peripheral flange 29 about the flange 12, and is provided with a cam slot 30 for each jaw 18, the stud 22 extending through said slot and having a head 31 which slidably engages the top of the plate 27 at opposite sides of the cam slot. A handle 32 is secured to the plate 27 at any suitable point and it is apparent that when the plate 27 is turned in the direction indicated by the arrow 33 in Fig. 2, the walls 34 of the cam slots 30 will force the jaws 18 inward like a chuck to grab and securely hold the tree, and when the plate is turned in the opposite direction the walls 35 of the cam slots will force the jaws to release the tree. It will be observed that the cam slots are of rather light slope so that the jaws are urged inward with great force, and yet are of sufficient slope to insure the movement of the jaws throughout the desired distance, to accommodate trees of different diameters. It will be noted further that with a single pull of the handle 32 the jaws may be moved the full distance inward or outward, as the case may be.

In order to lock the jaws in any desired position, I have provided the cup flange 12 with a screw 35 which is preferably fastened thereto as shown at 36, and which extends upward through the flange and through a concentric arcuate slot 37 in the plate 27 and, if desired, a washer 38, and receives a suitable nut such as a wing nut 39. It is apparent that when the nut 39 tightens the washer against the plate 27, the latter cannot move and accordingly the jaws are locked. It will be noted further that the bolt and studs 22 and associated slots hold the plate 27 in proper sliding relation to the flange 12.

The upper portion 40 of the cup 10 is provided with outside sockets 41 which may be formed in any suitable manner as by securing brackets 42 to the cup by spot welding 43 or otherwise and preferably also interlocking the bracket with the cup as at 43a and 43b. The shape of the sockets may be triangular as shown or otherwise. These sockets are of a size to slidably receive the upper ends 44 of preferably angular legs 45, and said ends may be slipped upward into the sockets and abut the underside 46 of the flange 12. The fit of the ends in the socket is preferably snug so that the ensemble may rest on a floor or other support in a stable manner, without rattling or looseness, each such bracket being preferably provided with a spring such as the tongue 47 which normally projects inwardly of its service position, as shown in dotted lines in Figs. 8 and 9, yet is so shaped as not to interfere with the insertion and removal of the leg in the respective socket, while exerting substantial pressure to provide a tight frictional engagement of the end in said socket. If desired, the leg could be the member provided with the spring. Thus when the legs are assembled with the cup, the entire stand may be lifted without danger of the legs falling out. The jaws 18 as they appear in Fig. 2 are adjusted at points intermediate their limits of movement for gripping the surface of the tree 49. It will be observed that the slope of the frusto-conical portion 11 of the cup is such that even when the largest diameter of tree adapted to be received by the cup is disposed therein, determined substantially by the size of the opening 28 in the control plate 27, there is a substantial length of the tree between the place of its engagement with the cup portion 11 and the place where it is gripped by the jaws 18, thereby insuring against the tree's becoming loose or swaying in the cup. The legs are for the most part of angular formation for strength and of such shape longitudinally that when the device is to be shipped, the legs may be nested together as shown in Fig. 7 to occupy minimum space.

The feet 51 of the legs are preferably spherically rounded, as at 52, and the legs branch away from the cup at a preferably slight angle to the horizontal, so that the cup in service is in close proximity to the floor and the feet are substantially distant from the cup to promote stability of the assembled stand and tree.

Further, in accordance with my invention, I provide means which could be an annular extension of the plate 27, or, as shown, a cirumferential series of ears 53 which may be integral extensions of the plate 27 or integrally united thereto as by spot welding 54 or the like. Each ear has a hole 55 and has a slot 56 from the hole to the outer periphery of the ear, forming in effect a keyhole. Fitted within the hole 55 is a rubber or other suitable resilient grommet or adapter 57 having an outer peripheral groove 58 in which the portion of the ear adjacent the hole is snugly received. The grommet may be split but is preferably endless as shown. Tightly fitted within the grommet is a lamp socket or base 59 of Bakelite, plastic, hard rubber or other suitable insulating material, the upper end 60 of which is enlarged so that it will not pass through the grommet. The base 59 is frictionally slidable within the grommet to project any desired height above the associated ear 53. Suitable wiring 62 is connected to the various lamp bases and to a plug 63 for connection to a wall outlet or the like. When a tree 49 is supported by the stand as above described and the lamps are lit, a very pleasant appearance is afforded by the ensemble.

The grommets not only retain the lamp bases securely in the desired positions of adjustment, but provide resilient supports which minimize the chance of breakage of the bases, the conventional types of which are frangible or subject to breakage. In the assembly of the parts, a grommet is expanded over the enlarged portions 60 of each lamp base, which may form part of a string, as shown in Fig. 2, and worked down below the bottom of the base and about the wiring associated therewith, as seen at 65 in Fig. 2. Then a portion of the wiring 62 between the lamp base and the grommet is slipped through a slot 56 and into the associated hole 55, thereby locating the lamp base over and the grommet below the hole 55. Thereupon the grommet is worked into the position substantially as illustrated, which is accomplished in a moment, the grommet preferably fitting the periphery of the hole loosely. After the grommet is thus positioned, the lower end of the lamp base is placed adjacent and over the hole in the grommet and downward pressure is applied to the upper end of the lamp base at the same time that upward pressure is applied to the bottom of the grommet to prevent the latter from being forced out of its assembled relation to the hole 55 during the downward pressure on the base, the latter being forced downward in the hole in the grommet to the extent desired. The diameter of the lower part of the socket is slightly greater than the normal interior diameter of the grommet so that when they are assembled there is a tight frictional engagement therebetween precluding accidental relative movement. Moreover, the lamp base expands the grommet into tight frictional engagement with the periphery of the hole 55, precluding accidental relative movement therebetween also. Of course, the parts may be disassembled in a manner suggested by the foregoing.

It is evident from the foregoing, moreover, that instead of clamping jaws individually by thumb nuts or the like, which support of the tree in an inclined position often results, I provide a stand which requires merely that the tree be placed therein, and the control plate swung and locked, involving a device simpler in construction and operation and giving much improved service.

The construction is extremely simple and attractive, involving a minimum of relatively movable parts, and it will be observed that the cup, leg sockets, channels, jaws, movable plate, ears and handle may all be made of sheet metal, so that the entire structure may be produced at extremely low cost, the grommets serving effectively to insulate the lamp bases from the stand.

Various modifications may suggest themselves to those skilled in the art without departing from the spirit of my invention, and, hence, I do not wish to be restricted to the specific form shown or uses mentioned, except to the extent indicated in the appended claims, which are to be interpreted as broadly as the state of the art will permit.

I claim:

1. A lamp mounting comprising a plate-like member having an electric lamp socket receiving hole therethrough and a relatively narrow wire-receiving passage which establishes communication between said hole and the outer edge of said member, whereby wire extending downward from the bottom of a lamp socket may be introduced laterally inwardly via said passage into said hole to then enable the lamp socket to be introduced axially into said hole, and means at said hole for gripping the lamp socket.

2. A Christmas tree stand comprising a receptacle having a peripheral upstanding wall and vertically spaced portions projecting laterally from said wall, the lower portion inwardly and the upper portion outwardly, said portions having openings, a channel-shaped member upstanding along the outer surface of said wall and having marginal means at which said member is spot welded to said wall, said member forming with said wall a socket for admitting a removable leg, the upper of said spaced portions constituting an abutment limiting insertion of the leg, said marginal means having upper and lower extensions fitted into said openings in said vertically spaced portions for holding said member in place to facilitate welding.

3. Christmas tree illuminating means comprising an annular plate for supporting lighting means including a plurality of electric lamp receiving sockets and wires connecting said sockets together in a string, means for securing said plate about an upstanding tree, said plate having a plurality of key-holes disposed at intervals in a circular series about the tree, the larger part of each key-hole being dimensioned to receive one such socket and being spaced radially from a peripheral edge of said plate, the restricted part of each key-hole interrupting said peripheral edge to pass the wires immediately associated with such socket to said larger part of said key-hole to enable such socket to fit axially in said larger part of said key-hole without interference from the wires extending from such socket.

4. A Christmas tree stand comprising a cup for receiving the trunk of a tree, an annular plate secured to said cup and extending transversely of and substantially coaxial with said cup, said plate having a circular series of keyhole slots adjacent a periphery of said plate, the narrow portions of said slots being open at said periphery, and resilient means in a circular formation at the larger portion of each slot for resiliently and radially gripping an electric lamp socket inserted thereinto, the narrow portions of said slots permitting the introduction of wiring of a wired string of electric lamp sockets to the larger portions of the slots to enable the sockets thereafter to be shoved down into said resilient means, clearance being provided adjacent said slots to enable the sockets to be installed in said gripping means while said plate is secured to said cup.

5. A Christmas tree stand comprising a cup for receiving the trunk of a tree, means extending outwardly from said cup for supporting the cup upright, an annular plate secured to said cup above said supporting means and extending transversely of and substantially coaxial with said cup, said plate having a circular series of keyhole slots adjacent a periphery of said plate, the narrow portions of said slots being open at said periphery, and resilient means in a circular formation at the larger portion of each slot for resiliently and radially gripping an electric lamp socket inserted thereinto, the narrow portions of said slots permitting the introduction of wiring of a wired string of electric lamp sockets to the larger portions of the slots to enable the sockets thereafter to be shoved down into said resilient means, clearance being provided adjacent said slots to enable the sockets to be installed in said gripping means while said plate is secured to said cup.

6. A Christmas tree stand comprising a cup for receiving the trunk of a tree, means extending outwardly from said cup for supporting the cup in an upright position, said means comprising a plurality of legs, and means fixed to the cup for removably seating said legs and for limiting the position thereof, an annular plate secured to said cup adjacent the upper edge thereof and lying in a plane substantially normal to the vertical axis of the cup, said plate having means for removably securing a plurality of lamp sockets, and chuck means carried by said cup for gripping the trunk of a tree, the means for securing the lamp sockets comprising a plurality of peripherally open housings whereby the lamp sockets may be assembled by lateral movement with reference to the cup.

LOTHAR KIESOW.

REFERENCES CITED

The following references are of record in the file of this patent:

UNITED STATES PATENTS

| Number | Name | Date |
| --- | --- | --- |
| 1,479,739 | Radtke | Jan. 1, 1924 |
| 1,853,164 | Block | Apr. 12, 1932 |
| 1,895,656 | Gadke | Jan. 31, 1933 |
| 1,900,807 | Fegley et al. | Mar. 7, 1933 |
| 2,205,271 | Pleiss | June 18, 1940 |
| 2,242,270 | Sims | May 20, 1941 |